United States Patent [19]
Ziegelmeyer

[11] 3,907,097
[45] Sept. 23, 1975

[54] PUSHER LUGS FOR CONVEYORS

[76] Inventor: Harold R. Ziegelmeyer, 314 Howard St., Medford, Oreg. 97501

[22] Filed: Mar. 7, 1972

[21] Appl. No.: 232,553

[52] U.S. Cl. .................................. 198/173; 198/171
[51] Int. Cl.² ........................................ B56G 19/00
[58] Field of Search .......... 198/175, 176, 168, 172, 198/200, 173

[56] References Cited
UNITED STATES PATENTS

| | | | |
|---|---|---|---|
| 231,186 | 8/1880 | Neacy | 198/176 |
| 1,371,968 | 3/1921 | Clement | 198/176 |
| 1,865,879 | 7/1932 | Newhouse | 198/176 |
| 1,944,374 | 1/1934 | Schmidtke | 198/173 |
| 2,089,738 | 8/1937 | Elmer | 198/168 |
| 3,653,492 | 4/1972 | Temme | 198/175 |

*Primary Examiner*—Evon C. Blunk
*Assistant Examiner*—Joseph E. Valenza
*Attorney, Agent, or Firm*—Clarence M. Crews

[57] ABSTRACT

The present invention has to do with pusher lugs which are of broad utility but which may be concisely explained by reference to a specific application. It is conventional practice to feed square-cut, unblemished stud scraps of random lengths through the medium of conveyor-carried, aligned pusher lugs past end slotting saws, in preparation for adhesive, end to end, interfitted union of the scraps. The novel lug has (1) a fixed base member and an adjustable pusher member mounted thereon with wedging clamping means of high dependability for securing fixity of relative fore and aft adjustment of the lug members; (2) leading and trailing external vertical ribs are provided on the outer face of the pusher member for reducing the liability of malfunction of the machine by extending the leading pusher surface farther into the field of action of the slotting saw while sharply limiting the lengthwise extent of the pusher member material through which the saw may be initially required to cut its way; and (3) an inexpensive, destructible key normally securing fixity of the base member of the lug relative to the conveyor but adapted to yield before damage is done to more expensive and more critical parts.

8 Claims, 8 Drawing Figures

INVENTOR:
HAROLD R. ZIEGELMEYER
by: Clarence M. Crews
HIS ATTORNEY

INVENTOR:
HAROLD R. ZIEGELMEYER
by: Clarence M. Crews
HIS ATTORNEY

PUSHER LUGS FOR CONVEYORS

This invention relates to improved adjustable pusher lugs for conveyors. Although these lugs have many uses, they are illustratively shown and described herein with reference to the pushing of unblemished, random length stud scraps through a conventional machine which forms wedge-shaped tongues and grooves of predetermined, uniform shape and uniform depth in the ends of the stud scraps, so that the scraps may be firmly and accurately, adhesively united end to end in precisely aligned relation to form composite studs of any desired lengths. The resulting composite studs, being straight, precisely interfitted, and completely free from knots and cracks, are of the highest quality.

For acceptable results, it is imperative that the stud scraps have precisely squared ends preliminary to slotting, and that the wedge-shaped slots and tongues be all of precisely predetermined, uniform depth, so that the united scraps may be snugly and completely interfitted, and will not be out of line with one another. This demands that the stud scraps be pushed past the saws precisely at right angles to their lengthwise dimensions. Each pusher lug, therefore, must be precisely adjustable and must be capable of dependably holding its adjustment.

In the conventional machine, random length scraps, having precisely squared ends, are manually laid crosswise upon a frame-supported or table-supported, continuously traveling chain link conveyor, comprising two parallel chains. With their left ends aligned, the scraps are advanced under a frictional drag, followed by a firm clamping pressure, to and past one set of slotting saws, which saws form the requisite wedge-shaped slots in the left ends, leaving the requisite wedge-shaped tongues intact.

The scraps are then automatically readjusted on the traveling conveyor, to align the right ends, being further advanced under frictional pressure, followed by a firm clamping pressure, to and past a second set of slotting saws which form the requisite, complementary wedge-shaped slots and tongues in the right ends. Adhesive is then sprayed into the right end slots and the pieces are discharged, ready for prompt endwise feeding into a joining machine which fits the pieces snugly and firmly together endwise, and, depending on the setting of the machine, automatically saws them into eight foot, twelve foot, or sixteen foot lengths. The lengths can be further varied if desired.

The conveyor referred to consists of two parallel chains, sprocket driven in unison from the leading end of the conveyor, with selected, corresponding links rigidly connected by cross bars. Each crossbar serves as, or is caused to provide, a fixed, central pusher. Right and left adjustable pusher lugs, mounted on the crossbar-connected links, are adapted to have their leading faces operatively aligned with the forward boundary of the fixed central pusher or lug. It is the conventional, adjustable lugs which my novel lug is designed to replace.

Each conventional, adjustable lug comprises two principal parts, namely, a base member, having as an integral part a projecting lower rib which fits into a longitudinal channel of the lug-supporting chain link, and an upstanding pusher member which is slidably mounted for fore and aft adjustment upon and relative to the base member of the lug. The base member is fixed in position on the chain link by two headed screws and the integral rib.

The pusher member of the conventional lug is mounted on a raised side portion of the base member by two headed screws whose shanks pass laterally and freely, through longitudinally extending slots formed in the raised portion of the base member. The forward ends of the pusher members always stand ahead of the leading ends of the base members by which they are carried. Each pusher member is limited in its retreat by an adjustable stop screw, the stop screw being threaded into the pusher member from the rear for engagement with the shank of one of the mounting screws. When the stop screw has been satisfactorily set, to align the leading face of the pusher member with the leading face of the fixed central pusher provided by the crossbar, the headed mounting screws are tightened to bind the pusher member in this determined position.

This type of control is very undependable. Even though the stop screw is of very low pitch, having a slope well within the angle of repose, the vibration and jolts to which it is subjected cause it to creep away from its assigned position, and the mere frictional hold of the mounting screws is inadequate. It is standard practice, therefore, in factories employing the described equipment, to recheck and correct loss of adjustment of the pusher members once for every eight-hour shift of duty. Such recheck and correction of a single machine ordinarily occupies the checker for substantially the full meal period of the machine operator.

In the conventional machine, each stud scrap is clamped forcefully, but impositively, as it passes a saw. Since each stud is intended to be slotted to a substantial depth (say fiveeighths of an inch) each stud is automatically made to protrude a substantial distance laterally beyond the forward edge of the pusher member nearer to the saw.

Upon contact of the stud scrap with the saw, a resistance to advance of the stud relative to the saw is encountered which has a tendency, particularly in the case of relatively short stud scraps, to swing the stud scrap end remote from the saw sharply forward about the leading edge of the pusher nearer to the saw, as a fulcrum. This can have, and in actual practice sometimes does have, one or both of two serious consequences.

By jamming the stud scrap, it may shear or deform the rib on the lower face of the base member of the fulcrum lug, making necessary the replacement of the entire base member.

It may, however, have the more serious consequence of mutilating the chain link on which the involved lug is mounted, making necessary the replacement of the link. This kind of repair generally requires the services of three men for a time of the order ot twenty-four working hours, and a corresponding down time of the machine.

The novel lug of the present invention obviates possible destruction of the lug base member, and of the chain link. The base member of my novel lug is formed with a groove or channel in which a key of aluminum or other destructible material is lodged, the key protruding beyond the lower face of the base member to form a separable rib. In the event of a malfunction of the kind referred to above, the aluminum key may be sheared off and may require replacement. Replacement involves only a few minutes of down time, and the loss of an extremely inexpensive part.

Malfunctions of the kind referred to are regrettable, even though no serious damage is done, because they at least involve some down time of the machine. It is an important feature of the present invention that provision is made for reducing the likelihood of such malfunction.

To this end, each pusher member is made to include a vertical rib at the leading end of its outer side which extends into the field of action of the saw blades, thus placing the potential fulcrum edge nearer to the saw obstructed scrap end, and thereby reducing the effective lever arm about which the saw acts in tending to skew the stud scrap. If the rib is first presented to the saw in an unslotted condition, the saw can very readily, and without damage, cut the rib. These slots still leave enough of the rib to maintain the fulcrum edge provided by the rib undisturbed and fully effective.

It is desirable, of course, to avoid the necessity for making distinctive right hand lugs and left hand lugs, and hence the lug should be so constructed that it can be set in place with one end leading for right hand use or with the other end leading for left hand use. To this end, it is desirable to duplicate at the rear outer margin the outstanding rib at the front outer margin of the pusher member of the lug, so that there will be an outstanding leading edge in either use of the lug. The initial slotting of two such ribs imposes no significant dulling or damaging effect upon the saw blades.

Other objects and advantages will hereinafter appear.

In the drawing forming part of this specification,

Figure 1:
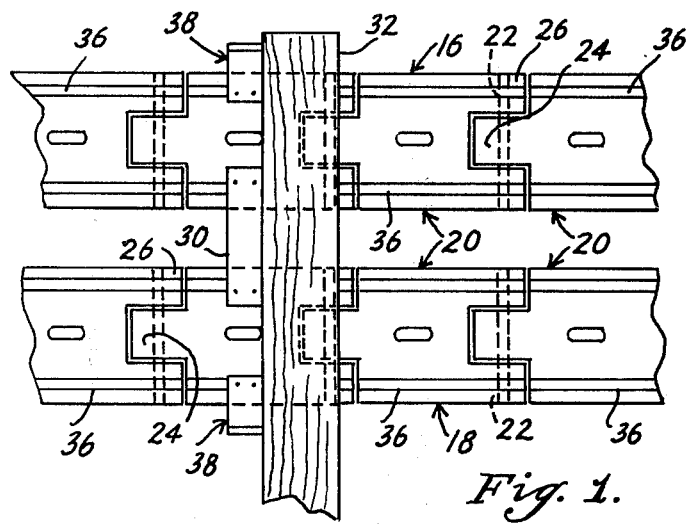
FIG. 1 is a fragmentary plan view of a small introductory portion of the conveyor, which shows a stud scrap being pushed forward by conveyor-carried pusher lugs.
Figure 2:
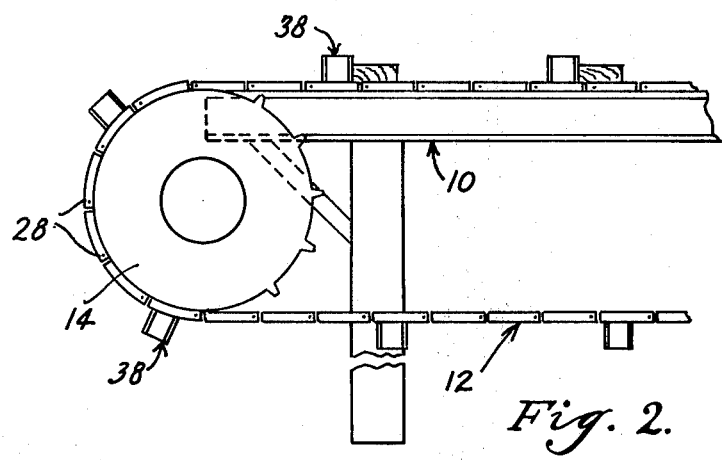
FIG. 2 is a fragmentary view in side elevation of the conveyor on a much smaller scale than FIG. 1.

The conventional illustrative machine includes many details which are not novel and which are of only incidental interest in connection with the present invention. The general organization, purpose and mode of operation of the illustrative machine have already been made clear.

The machine comprises a conveyor supporting frame 10 upon which the active run of a plural chain conveyor 12 is supported. The chain conveyor runs upon drive sprockets (not shown) at the delivery end of the conveyor and similar idler sprockets 14 at the introductory end of the conveyor. The chains are kept taut by conventional means, not shown.

The chain conveyor 12 includes parallel link chains 16 and 18, which are composed, respectively, of links 20 and connecting pins 22. As shown, each link has a trailing ear 24 which fits between two forward ears 26 of its following neighbor. A pin 22 is passed through the three aligned ears 26, 24, 26 and upset at its ends to retain it in operative relation to the associated link ears. Sprocket teeth 28, of the drive sprockets, engage in cooperative grooved formations (not shown) in the underfaces of the links.

Selected pairs of links (every fourth pair as illustratively shown) are rigidly connected to one another by crossbars 30 which, themselves, serve as fixed pusher lugs for stud scraps 32. Each member of a crossbar connected pair of links is provided with my adjustable lugs 34, which lugs are replacements or substitutes for the unsatisfactory adjustable lugs of the heretofore conventional machine.

As I have shown the chain links 18, every link is formed in its upper surface with two key-ways 36 but only the outer keyways of the crossbar connected links are used for the mounting of pusher lugs. The leading faces of the pusher members of the novel lugs 38 (FIGS. 4 to 8) must be precisely aligned with the pusher surface of the associated crossbar 30 (or a fixed pusher lug carried on or forming part of the crossbar), and it is important that they dependably hold such alignment. It is not essential that a stud scrap be pushed by three aligned lugs (although most of them are) but it is desirable to be able to handle and utilize scraps which are so short that they extend only from the center pusher to one or the other of the adjustable side lugs.

Each of the improved lugs 38 comprises a base member 40 which is adapted to be firmly and fixedly attached to a chain link with its leading surface located a short distance in back of the fixed center pusher surface of the crossbar 30. In the prior art lug the base member included a shallow fore and aft extending, integral rib which fitted into a slot 36 of the associated chain link.

In my improved lug the undersurface of the base member is formed with a shallow fore and aft extending channel 42, and a shallow destructible key 44, desirably of aluminum or other material having physical characteristics similar to those of aluminum, is snugly fitted in the channel. The key 44 includes a lower rib 46 which is adapted to fit into a key-way 36 of the associated chain link 18. The key-way 36 determines the lateral location of the base member of the lug, and the angular disposition of the base member.

Headed screws 48 have their shanks passed downward through the base member 40 and the key 44, and threaded into bores formed to extend through the bases of the slots 36 in the associated links. This does not involve any alteration of the chain links, but it does substitute a destructible, readily replaceable key for the integral rib which has heretofore been provided on the lower side of the base member. This change protects the base member and the associated chain link against the danger of mutilation and destruction.

The base member 40 has no raised side portion. It is formed with a broad channel 50 which has an undercut outer wall 52, on what amounts to an outer rib 53, and a beveled inner wall 54.

The lug also includes an upstanding pusher member 56 which is adjustable fore and aft, relative to the base member 40. The pusher member 56 fits slidably around the rib 53, having an undercut surface 58 which is complementary to the undercut surface 52. The pusher member includes an inner wall 60 which slopes oppositely to the wall 58 so that the walls 58 and 60 bound what amounts to a dovetail rib 62 on the pusher member 56.

The rib 62 is considerably narrower than the channel 50, so that a channel space having oppositely sloping, beveled walls 54 and 60 remains in the channel 50. A wedge member 64, having beveled walls 66 and 68, is pressed forcibly into this channel space by headed screws 70 whose shanks pass freely downward through the wedge member 64 and are threaded into the base member 40.

Not only do the low-pitched screws 70 act with high mechanical advantage in binding the pusher member 56 in fixed relation to the base member 40, but this is further enhanced and multiplied by the inclined plane action of the surfaces 54 and 66.

It has been mentioned that malfunction of the machine may be brought about in the conventional machine by the fact that the ends of studs 71 extend into the field of action of the saws for substantial distances beyond the outermost point at which the stud ends are engaged by the adjacent pusher members. When such a malfunction occurs it is generally because the outer edge of the pusher member nearer the saw is spaced inward from the adjacent stud end by an amount equal to, or greater than, the full depth of the slots.

While the pusher member could be generally extended well into the field of action of the saws, this would require the saws to slot the pusher members from end to end, a procedure which could severely impair the sharpness and hardness of the saws. To overcome this difficulty, I provide a narrow vertical rib 72 along the outer side of the leading margin of the aluminum pusher member 56. This leaves the potential fulcrum edge of the pusher member extended into the field of action of the saws without materially damaging the saws. The saws have to slot the rib only once.

Figure 3:
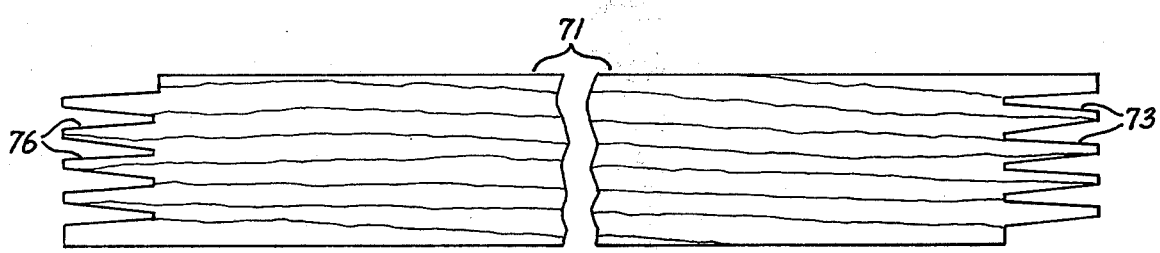
FIG. 3 is an edge view in elevation of a slotted stud scrap, the illustrated scrap being broken away intermediate its ends for compactness of illustration.
Figure 4:
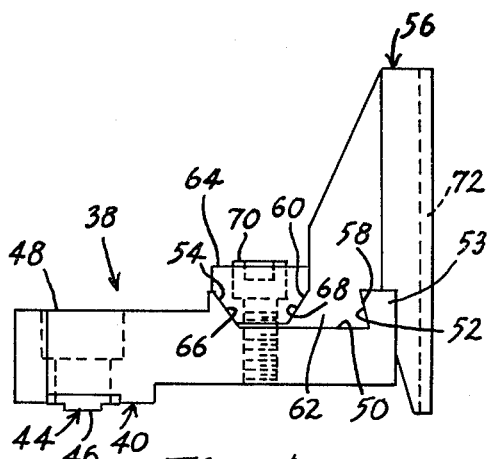
FIG. 4 is a view in front elevation of my novel lug and key.
Figure 6:
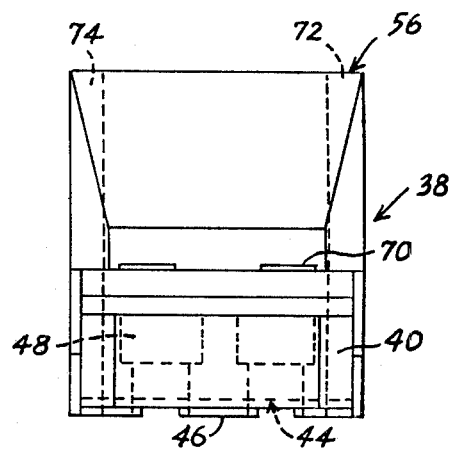
FIG. 6 is a view in elevation of the structure of FIG. 4 as seen from the left in FIG. 4.
Figure 5:
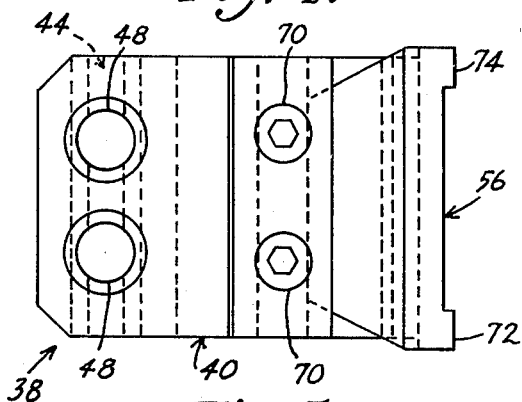
FIG. 5 is a plan view of the structure of FIG. 4.
Figure 7:
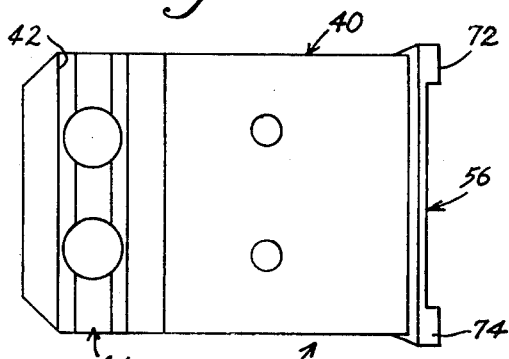
FIG. 7 is a bottom plan view of the structure of FIG. 4.
Figure 8:
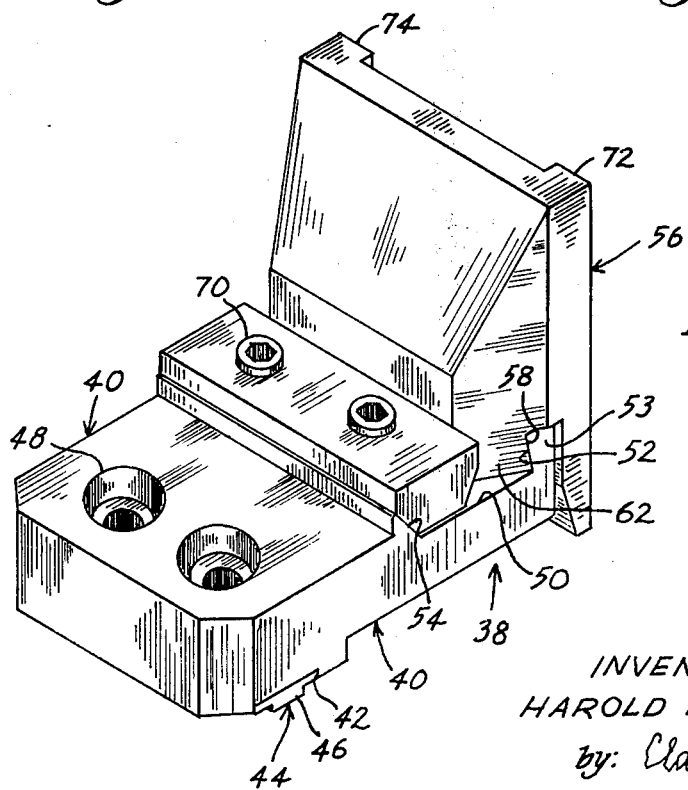
FIG. 8 is a perspective view of the structure of FIG. 4.

Since it is desirable to have the same lug adaptable equally to right hand service and to left hand service, the pusher members are desirably formed with ribs 74, identical to the ribs 72 along the outer side of the trailing margin. The requirement that the saw shall cut through both leading rib 72 and trailing rib 74 does not materially damage or strain the saws. Duplication of the rib enables a lug to be used either on the right side of the machine or on the left side of the machine with all of the advantages just referred to in either instance. The fact that a given lug may have had its vertical ribs slotted by the right hand saws does not disqualify it for subsequent left hand use where its vertical ribs will be slotted by the left hand saws. It is only the tips of the saws which penetrate the ribs. As will be noted by examination of the work piece of FIG. 3, the right hand slots 73 and the left hand slots 76 are disaligned. Both sets of slots are quite narrow at their extremities, however. If, therefore, the lug ribs are first slotted by the right hand saws, then turned around and slotted by the left hand saws, substantial portions of the ribs will still be intact and will extend into the field of the saws for the full thickness of the ribs.

I have described what I believe to be the best embodiment of my invention. What I desire to cover by letters patent is set forth in the following claims.

I claim:

1. A pusher lug adapted for firm and precise effective mounting on a conveyor component, comprising, in combination, a. a base member constructed and arranged through the provision of vertically extending, screw receiving passages for direct, fixed attachment to the top of a conveyor component, and formed with an upwardly facing, longitudinally extending channel which has a flaring, sharply sloping flat side,
    b. a pusher member mounted on the base member and interlocked therewith, but with freedom for sliding movement lengthwise of the base member, said pusher member having a depending, wedge-shaped rib portion lodged in said channel but occupying only a portion of the width thereof and itself having a sharply sloping side of opposite inclination to the flaring channel side of the base member, which side is opposed to, and substantially spaced from said sloping side of the base member channel, so that the two opposed sloping side converge from top to bottom,
    c. a wedging member extending along the channel and formed with sharply sloping, downwardly convergent, sides complementary to the opposed sloping sides of the base member and the pusher member, and broad enough to fill the space between said members and forcibly to broaden said space as it is forced downward between them, and
    d. headed screw means whose shanks pass freely downward through the wedging member and are threaded into the base member for jamming the wedging member downward between the opposed sloping walls of the base member and the pusher member to fix the pusher member immovably in a selected position with the pushing face located in advance of the forward face of the base member, the construction and arrangement being such that the pusher member can be freed for infinitely variable, fore and aft adjustment, within limits, by backing off the screw means, but can be powerfully wedged and clamped in the chosen position through the mechanical advantage afforded by the screw means, reinforced and multiplied by the wedging apart effect of the wedging member.

2. A pusher lug as set forth in claim 1 in which the base member and the pusher member have engaging overlapping, undercut surfaces which interlock said members and which urge the pusher member downward against the base member in response to the lateral thrust of the wedging member.

3. A pusher lug as set forth in claim 1 for mounting upon a conveyor which includes components having longitudinally extending keyways, in which the base member of the lug has a longitudinal channel formed in the bottom thereof for installation opposite a conveyor component keyway, and includes a separable destructible key which is lodged in said channel for resisting turning of the base member relative to the conveyor component, the key being thick enough to fill the channel and to extend downward beyond the lower boundary of the base member and to interfit substantially with a conventional keyway of the conveyor component on which the lug is mounted, the key serving as a substitute for a conventional, integral orienting rib of a conventional lug, but being of more fragile construction than the base member of the lug and the mounting component of the conveyor, and therefore adapted to yield when a malfunction of the machine occurs, thereby to protect the conveyor and the major parts of the lug against damage by limiting damage to the shearing of the base member attaching screw means and to destruction of the key.

4. A pusher lug as set forth in claim 1 for use in a machine having saws that slot the ends of stud scraps, in which the lug is specifically designed for pushing transversely disposed stud scraps past the end-slotting saws, and in which the pusher member of the lug has a narrow vertical rib formed along the outer face of its forward extremity for extending the outer edge boundary of the pushing face of the lug nearer to the stud end, thereby to reduce the tendency of the saw to skew the stud without requiring the pusher member to be slotted lengthwise through anything more than the narrow ribbed portion.

5. A pusher lug as set forth in claim 4 in which the pusher member of the lug also has a duplicative vertical rib formed along the rear extremity of its outer face, so that the lug can be oriented with equal advantage for use along either the right side or the left side of the conveyor with one or the other of the ribbed portions leading and only the two narrow ribs will require slotting.

6. A pusher lug together with means for firmly and precisely mounting the lug on a slotted conveyor component comprising, in combination, a base lug member constructed and arranged through the provision of screw holes for fixed attachment to a channeled conveyor compartment, and itself having a channel in its lower face, a destructible key which fits into the channels of the base member and the conveyor component, and head screw means which pass through the base member and the key and are threaded into the conveyor component, the construction and arrangement being such that under conditions of unusual strain the key will yield, thereby protecting the lug and the chain against damage beyond the destruction of the attaching screws and the key.

7. A pusher lug for pushing work pieces sidewise for end slotting, comprising a chain mountable base member and a pusher member mounted on the base member, said pusher member having a narrow vertical rib disposed at the outer side of its leading boundary for extending the leading boundary of the pusher member nearer to the extremity of the work piece, while avoiding the need for slotting the entire length of the pusher member.

8. A pusher lug as set forth in claim 7 in which the pusher member also has a narrow vertical rib disposed at the outer end of the trailing boundary, thereby adapting the lug for left hand or right hand use.

* * * * *

UNITED STATES PATENT OFFICE
CERTIFICATE OF CORRECTION

Patent No. 3,907,097                    Dated September 23, 1975

Inventor(s) Harold R. Ziegelmeyer

It is certified that error appears in the above-identified patent and that said Letters Patent are hereby corrected as shown below:

Column 8, line 2, "compartment" should read -- component --; line 5, "head" should read -- headed --.

Signed and Sealed this ninth Day of December 1975

[SEAL]

Attest:

RUTH C. MASON
*Attesting Officer*

C. MARSHALL DANN
*Commissioner of Patents and Trademarks*